United States Patent Office 3,531,473
Patented Sept. 29, 1970

3,531,473
PREPARATION OF 3-HYDROXY-1,4-BENZODIAZEPINES
Arthur Stempel, Teaneck, and Leo Henryk Sternbach, Upper Montclair, N.J., assignors to Hoffmann - La Roche Inc., Nutley, N.J., a corporation of New Jersey
No Drawing. Application Dec. 6, 1966, Ser. No. 600,347, now Patent No. 3,420,817, dated Jan. 7, 1969, which is a continuation-in-part of application Ser. No. 522,397, Jan. 24, 1966. Divided and this application Oct. 17, 1968, Ser. No. 768,545
Int. Cl. C07d 53/06
U.S. Cl. 260—239.3                10 Claims

ABSTRACT OF THE DISCLOSURE

A process for preparing a 3-hydroxy-1,4-benzodiazepin-2-ones by treating 4,1,5-benzoxadiazocin-2-ones with base.

RELATED APPLICATIONS

This application is a division of co-pending application Ser. No. 600,347, filed Dec. 6, 1966, in the names of Arthur Stempel and Leo Henryk Sternbach, now U.S. Pat. No. 3,420,817, which application is in turn a continuation-in-part of application Ser. No. 522,397, filed Jan. 24, 1966 (now abandoned) also in the names of Arthur Stempel and Leo Henryk Sternbach. The benefit of the dates of these earlier filed applications is hereby claimed.

The present invention relates to a process for converting 4,1,5-benzoxadiazocin-2-ones into 3-hydroxy-1,4-benzodiazepin-2-ones with a base.

The said 3-hydroxy-benzodiazepines are of the formula

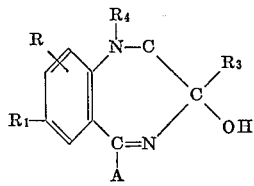

I wherein A is selected from the group consisting of

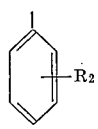

lower alkyl and $C_3$–$C_7$ cycloalkyl; R, $R_1$ and $R_2$ are selected from the group consisting of hydrogen, halogen, nitro, trifluoromethyl and lower alkyl and $R_3$ and $R_4$ are each selected from the group consisting of hydrogen and lower alkyl.

A comprehensive survey of the various process aspects of the herein disclosed invention may be had by reference to the following diagrammatical flow sheet wherein the symbols A, R, $R_1$, $R_2$, $R_3$ and $R_4$ have the same significance as ascribed thereto hereinabove; X designates a halogen atom, preferentially, selected from the group consisting of chlorine, bromine and iodine, R' is selected from the group consisting of hydrogen and lower alkyl and the character Z connotes a readily removably nitrogen protecting system. Preferably, R in the formulae illustrated in the said flow sheet is hydrogen. In a still more preferred embodiment, R and $R_3$ are both hydrogen. In an equally preferred variation, A is the grouping

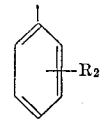

Still more preferred are those compounds wherein R and $R_3$ are both hydrogen, A is the grouping

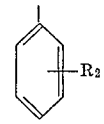

$R_2$ and $R_1$ is halogen, most advantageously, chlorine. In the most preferred embodiment, A is the grouping

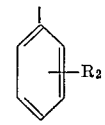

R, $R_2$ and $R_3$ are all hydrogen and $R_1$ is halogen, preferentially, chlorine. When A is the grouping

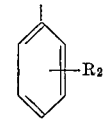

and $R_2$ is other than hydrogen, $R_2$ is advantageously joined to the phenyl group in the 2-position thereof and is, preferentially, fluorine.

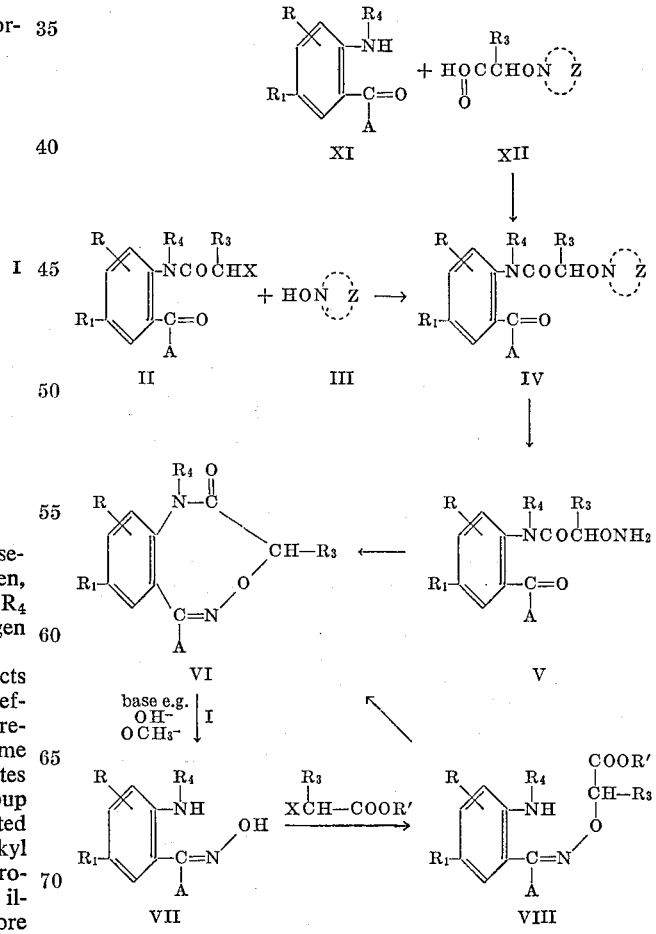

On reference to the flow sheet in which the process aspects of the present invention are illustrated graphically, one important aspect involves reacting a haloacetamidophenyl derivative, e.g. a haloacetamidobenzophenone of the Formula II above, with a hydroxylamine derivative of the Formula III above which has its nitrogen function protected by a readily removable nitrogen protecting system. By proceeding accordingly, there is obtained a novel 2-aminoxyacetanilide of the Formula IV above having its terminal nitrogen atom protected by the system Z. The protecting system Z of the so-formed compound is subsequently removed whereby to obtain a novel 2-aminoxyacetanilide of the Formula V above.

Yet another important process variation involves reacting an aniline derivative of the Formula XI above with an amino-oxyacetic acid derivative which has its amino-nitrogen function also protected by the readily removable nitrogen protecting system Z to thereby obtain, in a different manner than that described in the preceding paragraph, the novel 2-aminoxyacetanilides of the Formula IV.

Another important process aspect of the invention relates to a pocedure for preparing novel 4,1,5-benzoxadiazocin-2-ones of the Formula VI above via the ring closure of the said novel 2-aminoxyacetanilides of the Formula V above.

Still another important process variation relates to the reaction of an α-oxime of a 2-amino phenyl ketone of the Formula VII above with a haloacetic acid or an ester thereof to thereby prepare a novel imine (Schiff's Base) of the Formula VIII above and ring closing the same to the corresponding 4,1,5-benzoxadiazocin-2-one of the Formula VI.

Still another important embodiment of the present invention relates to a process for converting the said 4,1,5-benzoxadiazocin-2-ones of the Formula VI above into a 1,4-benzodiazepin-2-one bearing a hydroxy group in position-3 of the Formula I above.

As is indicated above, compounds of the Formula IV, V, VI and VIII are novel and are useful in view of their capability of being converted into therapeutically desirable compounds. Thus, such compounds constitute a part of the present invention.

Again, referring to the diagrammatical flow sheet illustrated graphically hereinabove and considering in greater detail the various steps and stages of the processes of the invention disclosed therein, the stage II→IV comprises the conversion of a 2-haloacetamido phenyl ketone of the Formula II above, e.g. a 2-haloacetamidobenzophenone, into a 2-aminoxyacetanilide of the Formula IV (e.g., a 2'-benzoyl-2-aminoxyacetanilide) having the terminal amino function thereof protected by a suitable protecting system via the reaction of the former with a hydroxylamine derivative of the Formula III above which has the nitrogen function thereof protected by the said protecting system Z. Said protecting system Z is comprised of a group or groups which are readily removable by conventional procedures, well documented in the literature. All that is required of the protecting system Z in order to render it suitable for the purposes of the present invention is that it be an operable protecting system for the nitrogen function of a compound of the Formula III above, that is, that it protects against the formation of unwanted side products insofar as the present invention is concerned, which would result if a compound of the Formula III above were to join to the compound of the Formula II above through the 2-amino nitrogen function of the latter. Systems for which the character Z is assigned and which will function efficaciously for the purposes of the present invention are those which consist of the phthaloyl group, a lower alkylidene group, e.g. isopropylidene, a benzal group or one carbobenzoxy group and one hydrogen group. Representative of hydroxylamine derivatives bearing a protecting group falling within the scope of the genus encompassed by Formula III above are N-hydroxy phthalimide, lower alkylidene oximes, such as acetone oxime, N-carbobenzoxy hydroxylamine, benzaldoxime and the like. It is, of course, to be understood that the compounds expressly named herein which are encompassed by the genus illustrated in Formula III above are only exemplary of the many the artisan would recognize are included within the purview of the present invention. Thus, from the above, it should be evident that the character of the system Z as illustrated in the hereinabove formulae is not critical and that for the system Z to be usable for the purposes of the present invention, it need only protect the nitrogen function of a compound of Formula III above from participating in the above-described first-stage reaction step and contain leaving groups which are readily removable by well established techniques, whereby to render the terminal nitrogent atom capable of participating in subsequent reaction steps.

Advantageously, the first stage (II→IV) is effected in the presence of an inert organic solvent such as an ether, e.g. tetrahydrofuan and the like. To insure good yields of the compounds of the Formula IV above, there is preferentially provided in the reaction zone, a tertiary organic base which functions as an acid acceptor to accept the hydrohalic acid formed. Suitable organic bases are tertiary amines such as tri-lower alkylamines, e.g. triethylamine, dimethylaniline, diethylaniline and the like. While temperature is not a critical aspect of this stage, elevated temperatures are preferred, e.g. at about the reflux temperature of the reaction medium. Thus, the reaction is conveniently effected by heating the reactants together, while agitating well, preferably in the presence of a tertiary organic bases as acid acceptor.

The stage IV→V, i.e. the stage in which the removal of the protecting system is effected, as is noted above, is conducted utilizing conventional procedures well established in the art. For example, if Z in Formula IV above consists of a phthaloyl group as the protective group, the system and its function is removed by treating such compounds with hydrazine hydrate, whereby to prepare the corresponding compound of the Formula V above. If the system Z in a compound of the Formula IV above consists of a lower alkylidene group, e.g. an isopropylidene group, said group being joined to the terminal nitrogen atom of the compound of the Formula IV above, the conversion of the last-mentioned compound is effected utilizing a dilute mineral acid, e.g. dilute hydrochloric acid. If Z in the Formula IV above consists of the removable group, benzal, the conversion of a so-substituted compound of the Formula IV above to the corresponding compound of the Formula V above can be similarly effected utilizing dilute mineral acids. If the system Z consists of carbobenzoxy as the removable group and hydrogen, then removal of the system and its function is effected utilizing a hydrogen bromide-acetic acid mixture. Preferably, the conversion of a compound of the Formula IV above to the corresponding compound of the Formula V above is effected under mild conditions, for example, at room temperature.

The stage (V→VI) is a particularly novel aspect of the present invention since it results in the unexpected ring closure of a compound of the Formula V above to a novel compound of the Formula VI above. Preferentially, this process step is conducted in the presence of an organic base such as pyridine, picoline, quinoline and the like or a salt thereof or mixtures of the salt and free base. Alternatively, any suitable inert organic solvent such as a lower alkanol, an ether such as tetrahydrofuran, dimethylformamide and the like, can serve as the reaction medium. While an organic base is indicated above as being preferentially provided in the reaction medium, it is, of course, to be understood that the same is not necessary to a successful performance of this process step and the ring closure can be effected, although with diminished yields, in an inert organic solvent per se and/or on long standing at room temperature and/or at elevated temperatures. Temperature and pressure are not critical aspects of this process step and thus the reaction can be effected at room temperature or above or below room temperature and atmospheric pressure. However, elevated temperatures, i.e. at about the reflux temperature of the reaction medium, are preferred.

The last stage of the process illustrated graphically above involves treating a compound of the Formula VI above with a base to unexpectedly obtain rearrangement to the desired 3-hydroxy benzodiazepin-2-ones of the Formula I above. Any suitable base which is capable of effecting the desired end can be suitably employed in this process stage. Representative of such are alkali metal hydroxides, e.g. sodium hydroxide; alkaline earth metal hydroxides; alkylates, e.g. alkali metal alkylates, such as sodium methoxide, sodium ethoxide and the like. Advantageously, the last stage is conducted in the presence of an inert organic solvent such as dioxane, tetrahydrofuran, dimethylformamide, lower alkanols such as ethanol and methanol and the like and at room temperature and atmospheric pressure, although if the reaction is conducted above or below room temperature, the desired end can also be effected.

Another stage in the process illustrated diagrammatically above involves the step of reacting a compound of the Formula XI with a compound of the Formula XII whereby to obtain a corresponding compound of the Formula IV. This stage (XI+XII→IV) comprises the conversion of the 2-carbonyl group containing aniline derivatives of the Formula XI, e.g. a 2-amino-benzophenone, a (2-methyl amino phenyl)lower alkyl ketone or a (2-amino phenyl)-$C_3$-$C_7$ cycloalkyl ketone, into the 2-aminoxy acetic acid aniline of the Formula IV above which has the amino function thereof protected by the protecting system Z. The conversion is effected by reacting the compound of the Formula XI with an aminoxy acetic derivative of the Formula XII which has the nitrogen function thereof protected by the above-identified protecting system Z. Representative of aminoxyacetic acid derivatives bearing a protecting group falling within the scope of the genus encompassed by Formula XII above are carbobenzoxyaminoxyacetic acid, phthalimidoxyacetic acid, lower alkylideneaminoxy acetic acid, benzaldaminoxyacetic acid and the like. It is, to be understood that the compounds expressly named herein which are encompassed by the genus illustrated in Formula XII above are only exemplary of the many the artisan would readily recognize are suitable for the purposes of the present invention and hence, are included within the purview thereof.

Advantageously, the conversion of the compound of the Formula XI above to the corresponding compound of the Formula IV above is effected in the presence of an inert organic solvent which may be a chlorinated hydrocarbon such as methylene chloride, ethers such as tetrahydrofuran, an aromatic hydrocarbon such as benzene and toluene and the like. In a preferred aspect, when converting the compounds of the Formula XI above to the corresponding compounds of the Formula IV above, a condensing agent is present. Among the many condensing agents suitable for the purposes of the present invention there may be included N,N'-dicyclohexylcarbodiimide, thionyl chloride, polyphosphoric acid and the like. Most preferred is N,N'-dicyclohexylcarbodiimide. Temperature and pressure are not critical aspects of this process variation. Accordingly, the process can be carried out at room temperature and at elevated temperatures. However, in a preferential aspect, the process is carried out below room temperature, most preferably, from a temperature of 0° C. to about 15° C.

Another stage in the process illustrated diagrammatically above involves the route from VII→VIII→VI. When converting the compound of the Formula VII above (a compound which contains an oxime group, syn with respect to the amino substituted phenyl group), to the corresponding compound of the Formula VIII above, with a haloacetic acid or an ester thereof, there is present as the reaction medium, an inert organic solvent which may be a lower alkanol such as methanol, ethanol and the like, an ether such as dioxane, tetrahydrofuran, N,N-dimethylformamide, dimethyl sulfoxide and the like. Preferably, the reaction medium in which the conversion is effected is made basic by the addition thereto of a basic material, preferably, a material which is strongly basic, such as a lower alkali metal hydroxide, e.g. sodium hydroxide, a lower alkali metal alkoxide, e.g. sodium methoxide and the like. While temperature and pressure are not critical aspects of this process variation, it is preferred to operate at elevated temperatures, most preferably, at about the reflux temperature of the reaction medium.

The conversion of the compounds of the Formula VIII above to the corresponding compounds of the Formula VI above is suitably effected in the presence of a cyclization agent and an inorganic solvent medium such as tetrahydrofuran and the like. Any suitable cyclization agent which is capable of achieving the desired end can be efficaciously employed in this process variation. Illustrative of such are N,N'-dicyclohexyl-carbodiimide, p-toluene sulphonic acid, thionyl chloride, polyphosphoric acid and the like. In a preferred embodiment, in this ring closing step when R' is H, the cyclization agent utilized is N,N'-dicyclohexylcarbodiimide. In this process step, temperature and pressure are not critical. However, when R' is hydrogen, it is preferred to operate below room temperature, preferentially in a range from about 0° C. to about 25° C. When R' is lower alkyl, elevated temperatures are preferred, e.g. at about the reflux temperature of the reaction medium.

Compounds of Formula VI above are useful not only as intermediates in the preparation of compounds of known therapeutic value but are additionally useful as anticonvulsant, muscle relaxant and sedative agents. Particularly useful for such purposes are compounds of the Formula VI above wherein $R_4$ is lower alkyl, e.g. methyl and A is the grouping

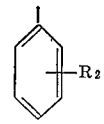

wherein $R_2$ is as above. The compounds of Formula VI above can be administered, parenterally or enterally, with the dosage regimen adjusted to fit the exigencies of a particular pharmacological situation. They can be compounded in conventional pharmaceutical dosage forms to provide capsules, tablets, elixirs, suppositories, suspensions, emulsions and the like.

Compounds of Formula VI above wherein $R_4$ is lower alkyl can be synthesized from compounds of Formula VI above wherein $R_4$ is hydrogen by alkylating such compounds. The alkylation can be efficaciously effected by treating compounds corresponding to Formula VI above wherein $R_4$ is hydrogen with, for example, an alkali metal hydride, e.g. sodium hydride or an alkali metal alcoholate such as sodium methoxide in the presence of an inert organic solvent such as toluene, dimethylformamide and the like to thereby form the sodio derivative of such compounds and then reacting the sodio derivative with an alkylating agent, e.g. a di-lower alkyl sulfate or a lower alkyl halide. Suitable dialkyl sulfates may be represented by dimethyl sulfate. Similarly, suitable alkyl halides may be represented by methyl iodide.

The term "lower alkyl" as utilized hereinabove is intended to represent straight or branched chain hydrocarbon groups such as methyl, ethyl, propyl, isobutyl and the like. The term "halogen" as employed herein designates all four forms thereof, chlorine, fluorine, bromine, and iodine, unless otherwise specified. The expression $C_3$–$C_7$ cycloalkyl connotes a cyclopropyl, cyclobutyl, cyclo hexyl, cyclopentyl and cycloheptyl group.

The foregoing is a description of new and valuable processes for the preparation of phamaceutically useful 3-hydroxy-1,4-benzodiazepin-2-ones and novel intermediates useful in their preparation. It will be readily apparent to one skilled in the art that variations of these procedures are possible.

The following examples are illustrative but not limitative of the process for preparing the aforesaid 3-hydroxybenzodiazepin-2-ones, the novel intermediates useful in the preparation thereof and novel benzoxadiazocines which are additionally useful for pharmaceutical purposes. All temperatures are stated in degrees centigrade.

Example 1

A mixture of 10 g. (28 mmoles) of 2'-benzoyl-2-bromo-4'-chloroacetanilide and 4.6 g. (28 mmoles) of N-hydroxy-phthalimide in 60 ml. of tetrahydrofuran containing 8.6 ml. of triethylamine was stirred and heated to reflux for a period of 75 minutes. The resultant mixture was then filtered. On addition of hexane to the filtrate, crystallization occurred. Filtration separated 2'-benzoyl-4'-chloro-2 - phthalimidoxyacetanilide, melting at 179–181.5°. Recrystallization from ethyl acetate gave the product melting at 183–184°.

Example 2

A mixture of 21.6 g. (59 mmoles) of 2'-benzoyl-2-bromo-4'-nitroacetanilide and 9.6 g. (59 mmoles) of N-hydroxyphthalimide in 130 ml. of tetrahydrofuran and 18.1 ml. of triethylamine was stirred and heated to reflux for 75 minutes. It was then filtered. On addition of hexane to the tetrahydrofuran filtrate, 2'-benzoyl-4'-nitro-2-phthalimidoxyacetanilide melting at 183.5–185° crystallized. Recrystallization from ethyl acetate gave cream colored needles melting at 203–204°.

Example 3

A mixture of 24.2 g. (63 mmoles) of 2'-benzoyl-2-bromo - 4' - trifluoromethylacetanilide and 10.3 g. (63 mmoles) of N-hydroxyphthalimide in 135 ml. of tetrahydorfuran and 19.3 ml. of triethylamine was stirred and heated to reflux for 75 minutes. The resultant mixture was then filtered. Upon addition of hexane to the filtrate, crystallization occurred. Filtration separated crude 2'-benzoyl-4' - trifluoromethyl-2 - phthalimidoxyacetanilide melting at 184-189°. Recrystallization from ethylacetate gave the product melting at 191–193°.

Example 4

Using the procedure described in Example 3, 2'-benzoyl-2-phthalimidoxyacetanilide melting at 174–176° was prepared by reacting 2'-benzoyl-2-bromoacetanilide with N-hydroxyphthalimide.

Example 5

To a solution of 6.8 g. (16 mmoles) of 2'-benzoyl-4'-chloro-2-phthalimidoxyacetanilide in a mixture of 80 ml. of chloroform and 80 ml. of ethanol, 1.8 g. (37 mmoles) of hydrazine hydrate and 1.8 ml. of water were added. After standing for 18 hours at room temperature, the mixture was filtered. The filtrate was concentrated to a small volume under reduced pressure and the residue was then partitioned between dilute ammonia water and ether. The ether layer was separated and extracted with a 5% solution of hydrochloric acid. The acidic extracts were combined, made slightly basic with dilute sodium hydroxide and extracted with ether. The organic layer was dried over sodium sulfate and concentrated to dryness. The residue crystallized on standing. Recrystallization from a mixture of benzene and hexane gave 2-aminoxy-2'-benzoyl-4'-chloroacetanilide.

Example 6

As in Example 5, 2-aminoxy-2'-benzoyl-4'-nitroacetanidile was prepared from 2'-benzoyl-4'-nitro-2-phthalimidoxyacetanilide. It melted at 141–143° after crystallization from a mixture of benzene and hexane.

Example 7

As in Example 5, 2-aminoxy-2'-benzoyl-4'-trifluoromethylacetanilide was prepared from 2'-benzoyl-4'-trifluoromethyl-2-phthalimidoxyacetanilide. It crystallized from hexane as colorless plates melting at 79–81°.

Example 8

As in Example 5, 2-aminoxy-2'-benzoylacetanilide was prepared from 2'-benzoyl-2-phthalimidoxyacetanilide.

Example 9

A solution of 5 g. (16 mmoles) of 2-aminoxy-2'-benzoyl-4'-chloroacetanilide in 100 ml. of pyridine was carefully added over a period of 1 hour to a stirred, refluxing solution of 5 g. of pyridine hydrochloride in 600 ml. of pyridine. Upon completion, the refluxing was continued for an additional 6 hours. Solvent was then distilled off under reduced pressure and the residue was partitioned between methylene chloride and water. The organic layer was washed successively with dilute hydrochloric acid, 5% sodium bicarbonate solution and water. After drying over sodium sulfate, the solvent was removed by distillation and the residue crystallized from ethyl acetate. The filtrate was distilled to remove ethyl acetate and the residue was crystallized from benzene to give 8-chloro-1,3-dihydro-6-phenyl - 2H-4,1,5 - benzoxadiazocin-2-one melting at 197–198.5°. Further crystallization did not alter the melting point.

Example 10

As in Example 9, 1,3-dihydro-6-phenyl-2H-4,1,5-benzoxadiazocin-2-one was prepared from the 2-aminoxy-2'-benzoylacetanilide synthesized in Example 8 and was found to have a melting point of 236–238° after crystallization from benzene.

Example 11

As in Example 9, 1,3-dihydro-8-nitro-6-phenyl-2H-4,1,5-benzoxadiazocin-2-one was prepared from 2-aminoxy-2'-benzoyl-4'-nitroacetanilide. The so-prepared product had a melting point of 253–255° after crystallization from methylene chloride and hexane.

Example 12

As in Example 9, 1,3-dihydro-8-trifluoromethyl-6-phenyl - 2H - 4,1,5 - benzoxadiazocin-2-one was prepared from 2-aminoxy-2'-benzoyl-4'-trifluoromethyl acetanilide. The so-prepared product had a melting point of 212–214° after crystallization from methylene chloride and hexane.

Example 13

A solution of 1 g. (3.5 mmoles) of 8-chloro-1,3-dihydro-6-phenyl-2H-4,1,5-benzoxadiazocin-2-one in 100 ml. of dioxane containing 3.5 ml. of 2N sodium hydroxide (7 mmoles) was stirred for 20 hours. A solid formed after about 3 hours of stirring. The solid was separated by filtration and gave the sodium salt of 7-chloro-1,3-dihydro - 3 - hydroxy-5-phenyl-2H-1,4-benzodiazepin-2-one melting at 190–205°. A solution of this product in 100 ml. of ethanol and 45 ml. of water (pH 12.2) was acidified to pH 1.7 by the addition of 3 N hydrochloric acid. On concentration of the acidic solution under reduced pressure, 7 - chloro - 1,3-dihydro-3-hydroxy-5-phenyl-2H-1,4-benzodiazepin-2-one crystallized.

Example 14

To a solution of 1.0 g. (3.5 mmoles) of 8-chloro-1,3-dihydro-6-phenyl-2H-4,1,5-benzoxadiazocin-2-one in 50 ml. of methanol, there was added 2.5 ml. of 2.79 N sodium methoxide in methanol (7 mmoles). The resultant reaction medium was stirred for 195 min. The solid that separated was removed by filtration to give the sodium salt of 7-chloro-1,3-dihydro-3-hydroxy-5-phenyl-2H-1,4-benzodiazepin-2-one. M.P. 196–210° dec. The last-mentioned salt was dissolved in 70 ml. of 50% aqueous ethanol and acidified to pH 2 with 3 N hydrochloric acid. 7-chloro-1,3-dihydro-3-hydroxy-5-phenyl-2H-1,4-benzodiazepin-2-one crystallized, melting point 197–200°. More product could be obtained by acidification of the methanol filtrate obtained above.

Example 15

To a solution of 2.0 g. (7 mmoles) of 8-chloro-1,3-dihydro-6-phenyl-2H-4,1,5-benzoxadiazocin-2-one in 25 ml. of dimethylformamide, 0.5 g. (11 mmoles) of sodium hydride (60% in mineral oil) was added. After stirring for 15 minutes at room temperature, 1 ml. (2.27 g., 16 mmoles) of methyl iodide was added and the stirring was continued for 45 minutes. On addition of ice, a white solid separated. Filtration separated crude 8-chloro-1,3-dihydro - 1 - methyl-6-phenyl-2H-4,1,5-benzoxadiazocin-2-one melting at 78–82°. Recrystallization from hexane gave the pure product melting at 130.5–131.5°.

Example 16

A solution of 12.0 g. (52 mmoles) of 2-amino-5-chlorobenzophenone and 11.7 g. (52 mmoles) of carbobenzoxyaminoxyacetic acid in 50 ml. of methylene chloride was cooled to 0° in an ice bath and a solution of 11.6 g. (0.57 mmoles) of dicyclohexylcarbodiimide in 125 ml. of methylene chloride was added dropwise over a period of 1 hr. After 15 hrs. at room temperature, the reaction medium was filtered. Acetic acid (3 ml.) was added to the filtrate, solvent was distilled off and the residue stirred with benzene. The mixture was then again filtered. Solvent was distilled off from the last-mentioned filtrate under reduced pressure and the residue, dissolved in methylene chloride, was passed through a column of Florisil. Then, methylene chloride was passed through the column. Thereafter, elution with ethyl acetate separated a material. Crystallization of this material from a mixture of benzene and hexane gave 2'-benzoyl-2-carbobenzoxyaminoxy-4'-chloroacetanilide, melting point 113–114°.

Example 17

A solution of 7.25 g. of 2'-benzoyl-2-carbobenzoxyaminoxy-4'-chloroacetanilide in 75 ml. of 20% hydrobromic acid in acetic acid was stirred for 30 min. at room temperature. On addition of 750 ml. of anhydrous ether, a gummy solid formed. After decantation of the supernatant, the gummy residue was partitioned between ether and 5% sodium bicarbonate. The ether layer was dried over sodium sulfate and concentrated to dryness. Crystallization of the residue from a mixture of benzene and hexane gave 2-aminoxy-2'-benzoyl-4'-chloroacetanilide (M.P. 85–86°).

Example 18

To a refluxing stirred solution of 12.5 g. of pyridine hydrochloride in 1250 ml. of pyridine, a solution of 12.5 g. of 2-aminoxy-2'-benzoyl-4'-chloroacetanilide in 500 ml. of pyridine was added slowly during 90 min. Refluxing was continued for 5 hours, then pyridine was removed by distillation under reduced pressure and the residue partitioned between methylene chloride and water. The organic layer was separated and washed with dilute hydrochloric acid, dilute sodium bicarbonate, and dried over sodium sulfate. Solvent was distilled off under reduced pressure and the residue crystallized from ethyl acetate. The resultant medium was then filtered. The filtrate was concentrated to dryness and the residue crystallized from benzene to give 8-chloro-1,3-dihydro-6-phenyl-2H-4,1-5-benzoxadiazocin-2-one, M.P. 193–197°. Further crystallization from benzene gave heavy colorless prisms of the product melting at 198–199°.

Example 19

To a suspension of 100 g. (0.4 mole) of 2-amino-5-chlorobenzophenone syn-oxime in 1500 ml. of ethanol, 43.2 g. (0.8 mole) of sodium methoxide was added followed by 56 g. (0.4 mole) of bromoacetic acid. The mixture was stirred and heated to reflux for 2 hrs. Solvent was then removed by distillation under reduced pressure. The residue was partitioned between methylene chloride and water. The organic layer was separated and the aqueous layer made more basic by addition of 10% sodium hydroxide. The aqueous layer was again extracted with methylene chloride and filtered through Hy-Flo to remove a small amount of insoluble material. On standing, the sodium salt of N-(2-amino-5-chlorodiphenylmethylene)aminoxyacetic acid (syn-isomer) crystallized. It was separated by filtration, dissolved in 2 l. of water and upon acidification with 3 N hydrochloric acid, the free acid crystallized. After recrystallization from aqueous ethanol, N-(2-amino-5-chlorodiphenylmethylene)aminoxyacetic acid (syn-isomer) melting at 164–6° was obtained.

Example 20

A solution of 25.0 g. (82 millimoles) of N-(2-amino-5-chlorodiphenylmethylene)aminoxyacetic acid syn-isomer in 1.1 of tetrahydrofuran was cooled to 5° and a solution of 15 g. (73 millimoles) of N,N'-dicyclohexylcarbodiimide in 100 ml. of tetrahydrofuran was added slowly. The mixture was stirred for 15 hrs. at room temperature and filtered. To the filtrate, 2 ml. of acetic acid were added followed by about 200 ml. of water. Distillation under reduced pressure removed tetrahydrofuran. The residue was dissolved in methylene chloride and washed successively with water, 5% sodium bicarbonate, and saturated salt solution. After drying the organic layer over sodium sulfate, the solvent was removed by distillation. The residue was dissolved in hot benzene and filtered to remove a small amount of insoluble material. On standing, 8-chloro-1,3 - dihydro - 6 - phenyl - 2H - 4,1,5 - benzoxadiazocin - 2-one, (M.P. 198–203°) crystallized. From the mother liquor, after addition of hexane, an impure fraction crystallized (M.P. 184–192°).

Example 21

To a solution of 13.5 g. (0.1 mole) of o-aminoacetophenone in 200 ml. of ether, 100 ml. of water was added. While stirring, 20.2 g. (8.9 ml., 0.1 mole) of bromoacetyl bromide dissolved in 50 ml. of ether was added slowly. At the same time, dilute sodium hydroxide was added to keep the mixture slightly alkaline. The ether layer was separated, washed with water and dried over sodium sulfate. Solvent was then removed by distillation. The residue crystallized from a mixture of chloroform and hexane to give 2'-acetyl-2-bromoacetanilide melting at 64–66°.

Example 22

A mixture of 25 g. (98 millimoles) of 2'-acetyl-2-bromoacetanilide and 16 g. (98 millimoles) of N-hydroxyphthalimide in 250 ml. of tetrahydrofuran containing 30 ml. of triethylamine was stirred and heated to reflux for 1¼ hr. The solid that formed was separated by filtration and stirred with water. The water insoluble material melted at 183–185°. Recrystallization of the latter from a mixture of chloroform and hexane gave pure 2'-acetyl-2-phthalimidoacetanilide melting at 185–186°. On addition of water to the tetrahydrofuran filtrate obtained above and removal of tetrahydrofuran by distillation under reduced pressure, an additional amount of crude 2'-acetyl-2-phthalimidoacetanilide, M.P. 177–181° was obtained. Recrystallization of the latter from a mixture of chloroform and hexane gave more of the pure product.

Example 23

A solution of 25 g. (74 millimoles) of 2'-acetyl-2-phthalimidoxyacetanilide in a mixture of 400 ml. of alcohol and 400 ml. of chloroform containing 8.5 g. of hydrazine hydrate and 8.5 ml. of water was kept at room temperature for 16 hrs. The solid that formed was separated by filtration. The filtrate was concentrated under reduced pressure while adding water. The crystalline product, 2'-acetyl-2-aminoxyacetanilide, M.P. 103°–106°, was separated by filtration. Recrystallization from a mixture of methylene chloride and hexane gave a pure product melting at 105°–106°.

Example 24

A solution of 5 g. (24 millimoles) of 2'-acetyl-2-aminoxyacetanilide in 200 ml. of pyridine containing 5 g. of pyridine hydrochloride was stirred and heated to reflux for 5 hrs. Pyridine was then removed by distillation under reduced pressure. The residue was partitioned between methylene chloride and water. The organic layer was washed successively with dilute hydrochloric acid, dilute sodium bicarbonate and water, then dried over sodium sulfate. After removal of the solvent by distillation, the residue was dissolved in hot ethyl acetate and filtered. The filtrate was then concentrated to a small volume. Crystallization of 1,3-dihydro-6-methyl-2H-4,1,5-benzoxadiazocin-2-one, M.P. 214–216° occurred. After recrystallization of this product from benzene, it was found to melt at 216–217°.

Example 25

To a solution of 24.7 g. (0.1 mole) of 2-amino-5-chlorobenzophenone syn-oxime in 500 ml. of ethanol and 36 ml. of 2.79 N sodium methoxide in methanol, 16.7 g. (0.1 mole) of ethyl bromoacetate was added. The mixture was stirred and heated to reflux for 2 hrs., then concentrated to a small volume under reduced pressure. A methylene chloride solution of the residue was washed with water, dried over sodium sulfate and concentrated to dryness under reduced pressure. The residue was dissolved in benzene and passed through a column of alumina. The benzene eluate was concentrated to dryness and crystallized from cyclohexane to give crude N-(2-amino-5-chlorodiphenylmethylene)aminoxyacetic acid ethyl ester, syn-isomer melting at 67–72°. Recrystallization from hexane gave colorless needless of pure product melting at 82–84°.

Example 26

A solution of 5 g. (15 mmoles) of N-(2-amino-5-chlorodiphenylmethylene) aminoxyacetic acid ethyl ester, syn-isomer and 2.9 g. (15 mmoles) of p-toluene sulfonic acid monohydrate in 250 ml. of xylene was stirred and heated to reflux for 20 hrs. Xylene was then removed by distillation under reduced pressure and the residue was partitioned between methylene chloride and water. After drying over sodium sulfate, the organic layer was concentrated to dryness. The residue was triturated with warm benzene, filtered to remove insoluble material and again concentrated to dryness. The residue was then triturated with ethyl acetate to remove more insoluble material. The residue obtained after evaporation of ethyl acetate was dissolved in methylene chloride and passed through a column of Florisil. Elution with ether gave 8-chloro-1,3-dihydro - 6 - phenyl - 2H - 4,1,5 - benzoxadiazocin-2-one which melted at 198–200° after recrystallization from benzene.

Example 27

A solution of 28 mmoles of 2'-benzoyl-2-bromo-4'-chloropropionanilide syn-oxime and 28 mmoles of N-hydroxyphthalimide and 8.6 ml. of triethylamine in 60 ml. of tetrahydrofuran was stirred and heated to reflux for 75 min. After cooling, filtration separated triethylamine hydrobromide. On addition of hexane to the filtrate, crystallization occurred and the product was separated by filtration yielding 2'-benzoyl-4'-chloro - 2 - (phthalimidooxy)-N-propionanilide, M.P. 164–166°.

Example 28

A solution of 0.2 mole of 2'-benzoyl-4'-chloro-2-(phthalimidooxy)propionanilide in a mixture of 900 ml. of chloroform and 900 ml. of ethanol containing 21 g. of hydrazine hydrate and 21 ml. of water was kept for 16 hrs. at room temperature. The gelatinous precipitate of phthalhydrazide that formed was separated by filtration. The filtrate was concentrated under reduced pressure, after addition of water to remove chloroform and ethanol. The solid that separated was removed by filtration to yield 2-aminoxy-benzoyl-4'-chloropropionanilide. After recrystallization from ethyl acetate, the product was found to have a melting point of 104–106°.

Example 29

As in Example 9, 8-chloro-1,3-dihydro-3-methyl-6-phenyl-2H-4,1,5-benzoxadiazocin - 2 - one was prepared from 2-aminoxy-2'-benzoyl-4'-chloropropionanilide. The so-prepared product had a melting point of 170–172° after crystallization from methylene chloride and hexane.

Example 30

A parenteral formulation containing the following ingredients:

| | Per cc. |
|---|---|
| 8-Chloro-1,3-dihydro-6-phenyl-2H-4,1,5-benzoxadiazocin-2-one mg | 0.5 |
| Propylene glycol cc | 0.4 |
| Benzyl alcohol (benzaldehyde free) cc | 0.015 |
| Ethanol 95% USP cc | 0.10 |
| Sodium benzoate mg | 48.8 |
| Benzoic acid mg | 1.2 |
| Water for injection q.s. cc | 1.0 | were prepared (for 10,000 cc.) as follows:

5 gm. of 8-chloro - 1,3 - dihydro-6-phenyl-2H-4,1,5-benzoxadiazocin-2-one were dissolved in 150 cc. of benzyl alcohol; 4,000 cc. of propylene glycol and 1,000 cc. of ethanol were added. 12 gm. of benzoic acid were dissolved in the above. 488 gm. of sodium benzoate dissolved in 3,000 cc. of Water for Injection were added. The solution was brought up to final volume of 10,000 cc. with Water for Injection. The solution was filtered thru O2 Selas candle, filled into suitable size ampuls, gassed with N₂ and sealed. It was then autoclaved at 10 p.s.i. for 30 minutes.

Example 31

A capsule dosage formulation containing the following ingredients were prepared as follows:

| | Per capsule, mg. |
|---|---|
| 8-Chloro-1,3-dihydro-6-phenyl-2H-4,1,5-benzoxadiazocin-2-one | 10 |
| Lactose, U.S.P. | 165 |
| Corn Starch, U.S.P. | 30 |
| Talc, U.S.P. | 5 |
| Total weight | 210 |

The 8-chloro-1,3-dihydro-6-phenyl-2H-4,1,5-benzoxadiazocin-2-one, the lactose and the corn starch were mixed in a suitable mixer. The so formed mixture was further blended by passing it through a Fitzpatrick Comminuting Machine with a #1A screen with knives forward. The blended powder was returned to the mixer, the talc was added and the resultant mixture was blended thoroughly. The mixture was filled in #4 hard shell gelatin capsules on a Parke Davis capsulating machine.

Example 32

A tablet dosage formulation containing the following ingredients

| | Per tablet, mg. |
|---|---|
| 8-Chloro-1,3-dihydro-6-phenyl-2H-4;1,5-benzoxadiazocin-2-one | 5.00 |
| Dicalcium phosphate dihydrate, unmilled | 195.00 |
| Corn starch | 24.00 |
| Magnesium stearate | 1.00 |
| Total weight | 225.00 | were prepared as follows:

The 8-chloro-1,3-dihydro-6-phenyl-2H-4,1,5 - benzoxadiazocin-2-one and the corn starch were mixed together and passed through a #00 screen in Model "J" Fitz with hammers forward. This premix was then mixed with the dicalcium phosphate and one-half of the magnesium stearate, passed through a #1A screen in Model "J" Fitz with knives forward and slugged. The slugs were passed through a #2A plate in a Model "D" Fitz at slow speed with knives forward, and the remaining magnesium stearate was added. The mixture was mixed and compressed.

We claim:

1. A process for the preparation of a compound of the formula

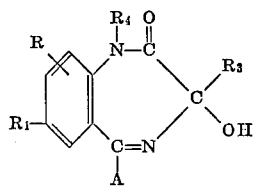

wherein A is selected from the group consisting of lower alkyl, $C_3$–$C_7$ cycloalkyl and

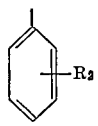

R, $R_1$ and $R_2$ are selected from the group consisting of hydrogen, halogen, nitro, trifluoromethyl and lower alkyl and $R_3$ and $R_4$ are each selected from the group consisting of hydrogen and lower alkyl
which comprises treating a compound of the formula

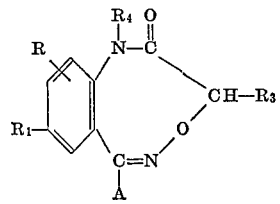

wherein A, R, $R_1$, $R_3$ and $R_4$ are as above with a base in the presence of an inert organic solvent.

2. A process as defined in claim 1 wherein R and $R_3$ are both hydrogen and A is the grouping

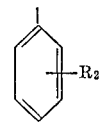

3. A process as defined in claim 2 wherein $R_1$ is halogen and $R_2$ is hydrogen.

4. A process as defined in claim 2 wherein $R_1$ is halogen and $R_2$ and $R_4$ are hydrogen.

5. A process as in claim 2 wherein the base utilized is selected from the group consisting of alkali metal hydroxides and alkaline earth metal hydroxides.

6. A process as defined in claim 4 wherein the base utilized is selected from the group consisting of alkali metal hydroxides and alkaline earth metal hydroxides.

7. A process as in claim 1 wherein $R_1$ is nitro, R and $R_3$ are hydrogen and A is the grouping

8. A process as in claim 7 wherein the base utilized is selected from the group consisting of alkali metal hydroxides and alkaline earth metal hydroxides.

9. A process as in claim 1 wherein $R_1$ is trifluoromethyl, R and $R_3$ are hydrogen and A is the grouping

10. A process as in claim 9 wherein the base utilized is selected from the group consisting of alkali metal hydroxides and alkaline earth metal hydroxides.

References Cited

UNITED STATES PATENTS

| | | | |
|---|---|---|---|
| 3,176,009 | 3/1965 | Bell | 260—239.3 |
| 3,197,467 | 7/1965 | Bell | 260—239.3 |
| 3,420,817 | 1/1969 | Stempel et al. | 260—239.3 |

JOHN D. RANDOLPH, Primary Examiner

R. T. BOND, Assistant Examiner

U.S. Cl. X.R.

260—999